United States Patent
Delavaux et al.

(10) Patent No.: US 6,850,712 B1
(45) Date of Patent: Feb. 1, 2005

(54) OPTICAL FIBER TRANSMISSION SYSTEM WITH POLARIZATION MULTIPLEXING TO REDUCE STIMULATED BRILLOUIN SCATTERING

(75) Inventors: Jean-Marc Pierre Delavaux, Franklin Township, NJ (US); Aydin Yeniay, Bethlehem, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 564 days.

(21) Appl. No.: 09/584,900

(22) Filed: May 31, 2000

(51) Int. Cl.[7] .............................................. H04B 10/04
(52) U.S. Cl. ...................................... 398/201; 398/183
(58) Field of Search ................................ 398/193, 188, 398/187, 184, 183, 201

(56) References Cited

U.S. PATENT DOCUMENTS

| | | | | | |
|---|---|---|---|---|---|
| 4,560,246 | A | * | 12/1985 | Cotter ............................ | 385/27 |
| 4,769,853 | A | * | 9/1988 | Goodwin et al. ............ | 398/188 |
| 5,373,385 | A | * | 12/1994 | Darcie et al. ................ | 398/187 |
| 5,930,024 | A | * | 7/1999 | Atlas ............................ | 359/279 |
| 6,018,391 | A | * | 1/2000 | Yoshida ....................... | 356/484 |
| 6,285,197 | B2 | * | 9/2001 | Walker ......................... | 324/603 |
| 6,388,785 | B2 | * | 5/2002 | Havstad et al. .............. | 359/161 |
| 6,486,986 | B1 | * | 11/2002 | Fuse ............................. | 398/186 |
| 6,545,785 | B1 | * | 4/2003 | Heflinger et al. ............ | 398/188 |
| 6,604,871 | B2 | * | 8/2003 | Cao .............................. | 398/158 |
| 6,616,353 | B1 | * | 9/2003 | Helkey ......................... | 398/183 |

OTHER PUBLICATIONS

M. Howerton, "SBS Suppression Using Depolarized Source for High Power Fiber Applications", Journal of Lightwave Technology, vol. 14, No. 3, IEEE, 1996.*
F. Heismann, "High–Speed Polarization Scrambler with Adjustable Phase Chirp", Journal of Selected Topics in Quantum Electronics, vol. 2, No. 2, IEEE, 1996.*
L. Möller, "Novel Aspects of Specral Broadening Due to Fiber Amplifier Phase Noise", Journal of Quantum Electronics, vol. 34, No. 9, IEEE, 1998.*

* cited by examiner

Primary Examiner—Jason Chan
Assistant Examiner—Shi K. Li

(57) ABSTRACT

A technique for suppressing stimulated Brillouin scattering SBS along an optical fiber signal path utilizes polarization modulation at the transmitter to split the launched power into orthogonal polarization states. By reducing the power along each polarization, SBS will be reduced. Linewidth broadening of the optical source is achieved by introducing: (1) a incoherence between the polarization states (using a time delay along the signal path of one polarization state); and (2) a frequency shift between the polarization states (using an acousto-optic modulator along the signal path of the remaining polarization state).

15 Claims, 10 Drawing Sheets

COMPARISION OF INPUT LIGHT POLARIZATION STATES AND FM MODULATION ON SBS THRESHOLDS
SOURCE: DFB LASER ($\lambda$=1552nm AND $\Delta\nu$=1.5MHz)

EFFECTS OF INPUT LIGHT POLARIZATION STATES ON THE BRILLOUIN SPECTRA USING THE FM AND PMX TECHNIQUES: a) TWO COLLINEAR POLARIZATIONS, b) TWO ORTHOGONAL, c) POLARIZED WITHOUT PMX

SOURCE: DFB LASER λ=1552nm AND Δν=1.5MHz, FIBER: 25km ALL WAVE4. FM=100MHz

SBS SPECTRA FOR CW SIGNAL:
(a) POLARIZED, (b) TWO ORTHOGONAL, (c) TWO COLLINEAR POLARIZATIONS

OPTICAL FIBER TRANSMISSION SYSTEM WITH POLARIZATION MULTIPLEXING TO REDUCE STIMULATED BRILLOUIN SCATTERING

TECHNICAL FIELD

The present invention relates to an optical fiber transmission system with reduced levels of stimulated Brillouin scattering (SBS) and, more particularly, to the use of polarization multiplexing of the pump signal to reduce the effects of SBS.

BACKGROUND OF THE INVENTION

In long distance optical fiber transmission systems, it is desirable to launch as high an optical power as possible, enabling the lightwave signals to be transmitted without the need for additional components such as repeaters and amplifiers, which increase the cost of communication systems. However, the combination of high powered, narrow linewidth optical sources with low-loss single mode transmission fiber opens the possibility of signal degradation and increased bit error rates, attributable to a host of nonlinear fiber-related phenomena that have been previously considered inconsequential. These nonlinear phenomena include stimulated Brillouin scattering (SBS), stimulated Raman scattering, self-phase modulation and, if two or more optical channels are involved, cross-phase modulation and four-wave mixing.

Stimulated Brillouin scattering within a fiber results from photons being scattered by localized refractive index variations induced by acoustic waves. These refractive index variations are caused, in particular, by ultrasonic vibrations in the glass lattice that makes up the fiber core. Furthermore, owing to the dependence of refractive index on light intensity in the nonlinear regime, the presence of intense light in the fiber will also induce lattice vibrations, which in turn induce sound waves that then scatter more light. Ultimately, light from an intense forward propagating signal (referred to as a "pump" signal) can provide gain for a backward propagating or "Stokes" signal. This scenario is a classical description of SBS. SBS threshold power (denoted as $P_{SBS}$) is arbitrarily defined as the level of input optical pump signal power ($P_{pump}$) at which the power of the backward Stokes signal ($P_{Stokes}$) becomes equal to $P_{pump}$ at the fiber input. SBS threshold power increases with the linewidth of the light being propagated along a fiber. For this reason, concern over the adverse effects of SBS was minimal—until the introduction of narrow linewidth laser sources. As narrow linewidth sources become more readily available, and as such lasers are likely to be the optical source of choice for future optical fiber transmission systems, SBS has the potential for significantly contributing to signal degradation at relatively low input power levels.

To date, several techniques have been demonstrated to suppress the SBS in optical transmission systems. In general, these techniques fall into two main categories: (1) modifications of the fiber media to reduce SBS; or (2) modifications of the laser source to alter the linewidth. In the first category, it is possible to influence the refractive index (and acoustic velocity) along the longitudinal direction of the fiber, thus varying the Brillouin gain profile along the fiber. This variation avoids the accumulation of gain within a small bandwidth and results in a broader gain profile and high SBS threshold. However, this fiber modification approach is not practical, since it is relatively difficult to introduce these effects into the fiber as it is manufactured and, more importantly, cannot be used to reduce SBS on the extensive embedded base of the optical fiber network already in place.

The alternative solution of modifying the laser source to affect the level of SBS has been found to be more practical and can be used with existing optical fiber systems. This technique is based on the property of broadening the laser linewidth by means of modulation. U.S. Pat. No. 5,329,396, issued to D. A. Fishman et al. on Jul. 12, 1994, discloses one exemplary prior art arrangement which impressed FM modulation on the laser bias current to increase the linewidth. This direct FM approach, by using a dither signal, provides a relatively large frequency excursion (on the order of, for example, 10 GHz). By means of this technique, the SBS threshold has been increased as much as 15 dB. However, impressing an FM signal on the laser bias has been found to also result in substantial AM (defined as "residual AM"), degrading system performance. Alternatively, external phase modulation (PM) can be used to broaden the laser linewidth. U.S. Pat. No. 5,166,821 issued to D. Huber on Nov. 24, 1992 discloses one such PM arrangement. However, in optical transmission systems, this external PM technique typically degrades the dispersion characteristics of the signal due to an excessive increase in the linewidth of the laser source.

Thus, a need remains in the art for an arrangement that reduces SBS without introducing other types of signal degradation in the optical transmission system.

SUMMARY OF THE INVENTION

The need remaining in the art is addressed by the present invention, which relates to an optical fiber transmission system with reduced levels of stimulated Brillouin scattering (SBS) and, more particularly, to the use of polarization multiplexing of the pump signal to reduce the effects of SBS.

In accordance with the present invention, a laser optical output is split into orthogonal polarizations (denoted "S" and "P") and allowed to propagate along two different signal paths. A time delay ($\tau$) is introduced along one signal path in order to break the coherence between the signals. One polarization is also frequency-shifted ($\Delta f$) with respect to the other. In a preferred embodiment, an acousto-optic (A-O) modulator is used to introduce the frequency shift. These two incoherent, frequency-shifted orthogonal signals are then re-combined onto a common signal path. Since SBS is a polarization-dependent phenomenon, by splitting the optical signal as defined above, the presence of SBS on each polarization is significantly reduced.

An advantage of the arrangement of the present invention is the reduction of various other polarization-dependent phenomena in the optical system (.e.g., polarization-dependent losses, spatial hole burning).

In a preferred embodiment of the present invention, the polarization multiplexing can be combined with either one or both of the prior art FM and PM SBS reduction techniques to achieve even greater reductions in this effect.

Various other features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
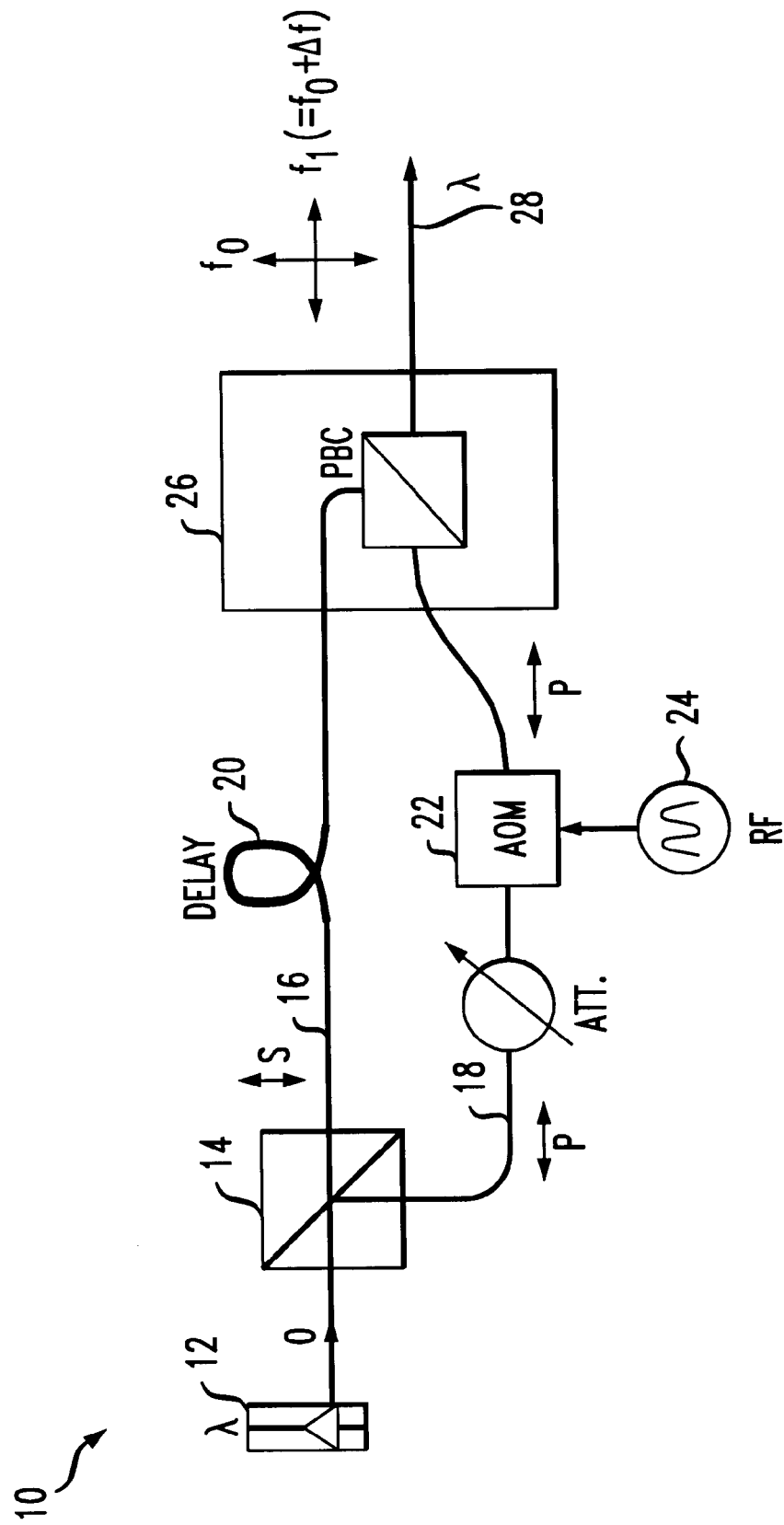
FIG. 1 illustrates an exemplary polarization multiplexing optical transmitter of the present invention for reducing SBS.

FIG. 1 illustrates an exemplary polarization multiplexed optical input signal arrangement 10 formed in accordance with the teachings of the present invention. Arrangement 10 includes a laser source 12, which can comprise any conventional type of semiconductor laser (for example, a distributed feedback (DFB) laser) with a wavelength chosen in a desirable optical communication window, such as 1300 nm or 1550 nm. The optical signal O from laser source 12 is subsequently applied as an input to a power splitting component 14 (e.g., a polarization beam splitter or coupler) which functions to split optical signal O into orthogonal components, denoted S and P in FIG. 1, where these orthogonal components are launched onto separate signal paths 16 and 18. In the particular embodiment as shown in FIG. 1, the S component is coupled to signal path 16 and the P component is coupled to signal path 18. It is to be noted that signal paths 16 and 18 may comprise polarization-maintaining optical fibers, integrated waveguides, or any other media suitable for supporting the propagation of polarized optical signals. Thereafter, one of the polarized components (in this case, the S component) is passed through a delay element 20, so as to break the coherence (in time) between the S and P components by introducing a predetermined delay, denoted $\Delta\tau_D$, onto one of the components. When using optical fiber, delay element 20 may simply comprise an additional length L of optical fiber.

The remaining polarized signal component, in this example the P component, is applied as an input to a frequency-shifting device 22, in this case an acousto-optic modulator (AOM). An external RF source 24 is used to supply a frequency shift signal rf to AOM 22, resulting in a predetermined frequency shift $\Delta f$ impressed upon polarized component P. The time-delay component S and the frequency-shifted component P are then applied as separate inputs to a polarization beam combiner 26, which functions to couple the signals together and provide them as the output of optical input signal arrangement 10, along an output signal path 28.

In accordance with the present invention, therefore, the introduction of both incoherence in the time domain and a shift in the frequency domain results in significantly increasing the Brilloiun threshold for each polarization (which remain independent of each other). Additionally, the polarization multiplexing technique of the present invention, by providing "depolarization" of the input signal, will also result in reducing various other polarization-dependent impairments (such as, for example, polarization-dependent losses and polarization hole burning).

Figure 2A:
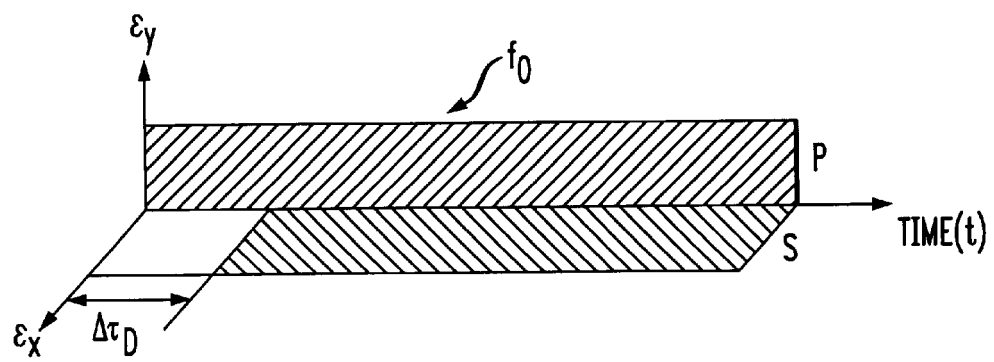
FIGS. 2A–2B contains graphs of intensity variation, with respect to time and frequency, for the arrangement of the present invention as illustrated in FIG. 1.
Figure 2B:
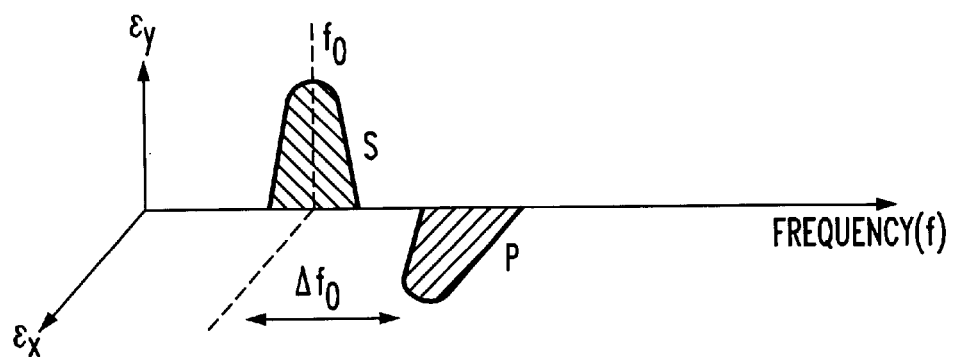

FIG. 2 illustrates intensity variations associated with arrangement 10 of FIG. 1. FIG. 2A illustrates the separation of intensity along the orthogonal S and P components, as well as the time delay $\Delta\tau_D$ provided by delay element 20 on signal component S. FIG. 2B is a frequency domain diagram of the signal intensity, showing in particular the frequency shift $\Delta f$ between the S and P components supplied by AOM 22.

Figure 3:
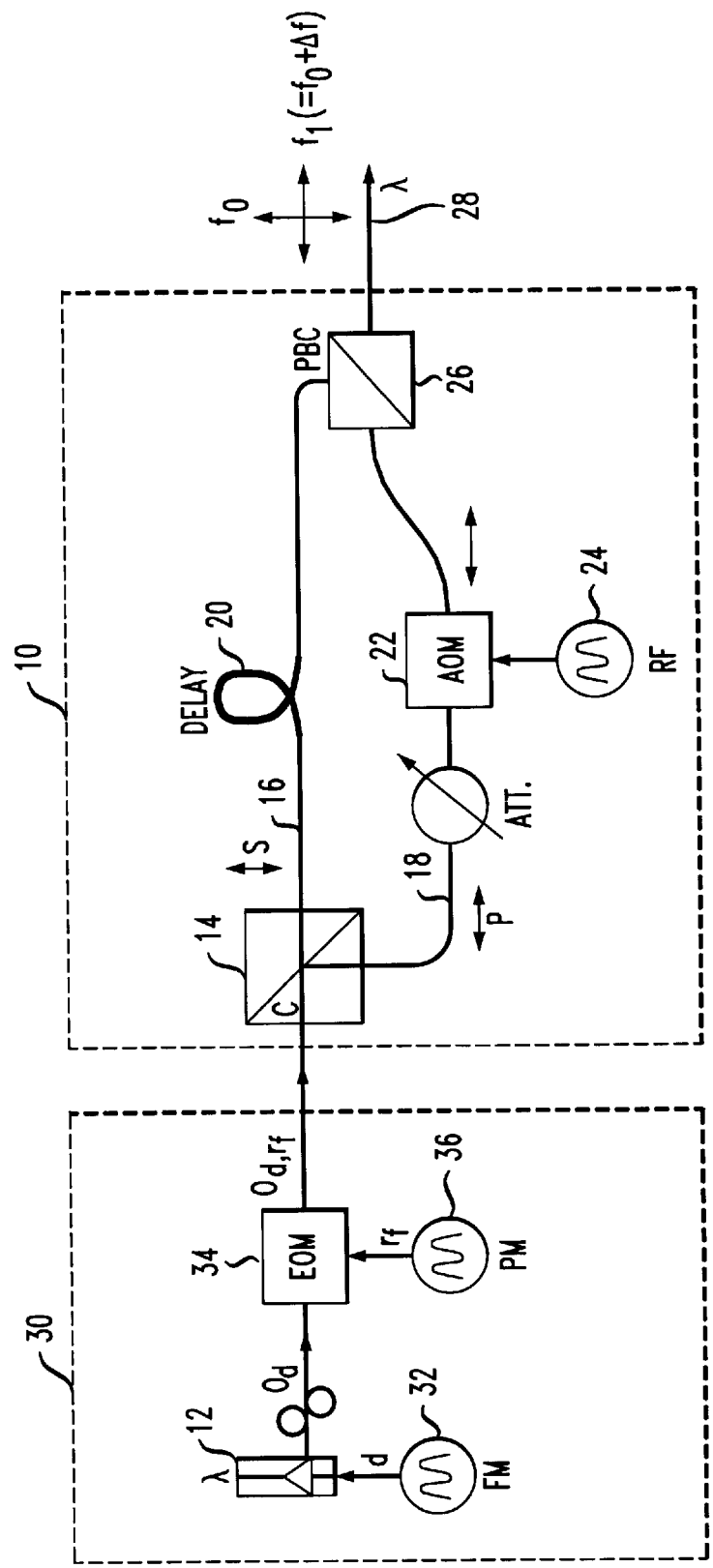
FIG. 3 illustrates an alternative embodiment of the present invention, incorporating prior art SBS suppression techniques with the polarization multiplexing scheme of the present invention.

As mentioned above, it is possible to use the polarization multiplexing technique of the present with either of the prior art FM and PM techniques to achieve even greater SBS suppression. FIG. 3 illustrates an exemplary embodiment of the present invention including polarization multiplexer 10, as shown in FIG. 1, in combination with a pre-multiplexer element 30 for providing either one of FM and PM (the phase modulation elements are illustrated in phantom in FIG. 3, denoting this as an alternative to FM). Referring to FIG. 3, laser source 12 is illustrated as being directly coupled to an FM source 32, which functions to apply a dither signal d directly to the laser bias. In one embodiment, dither signal d may comprise a 50 mV sinusoidal signal at a frequency of approximately 100 MHz. The presence of the dither signal provides large frequency excursions and can increase the SBS threshold by an additional 15 dB. As an alternative, a phase modulation arrangement comprises an electro-optic modulator (EOM) 34, such as a Mach-Zehnder interferometer, and an external drive source 36. Drive source 36 is used to supply an RF signal, denoted rf, to control the phase modulation within EOM 34. It is known that the linewidth broadening supplied by, such a phase modulation arrangement is proportional to both the frequency and modulation index of the RF signal, and is also on the order of 15 dB. In either the FM or PM case, the laser output is subsequently applied as an input to power splitting component 14, where this signal is then processed in the same manner as described above in association with FIG. 1.

Figure 4:
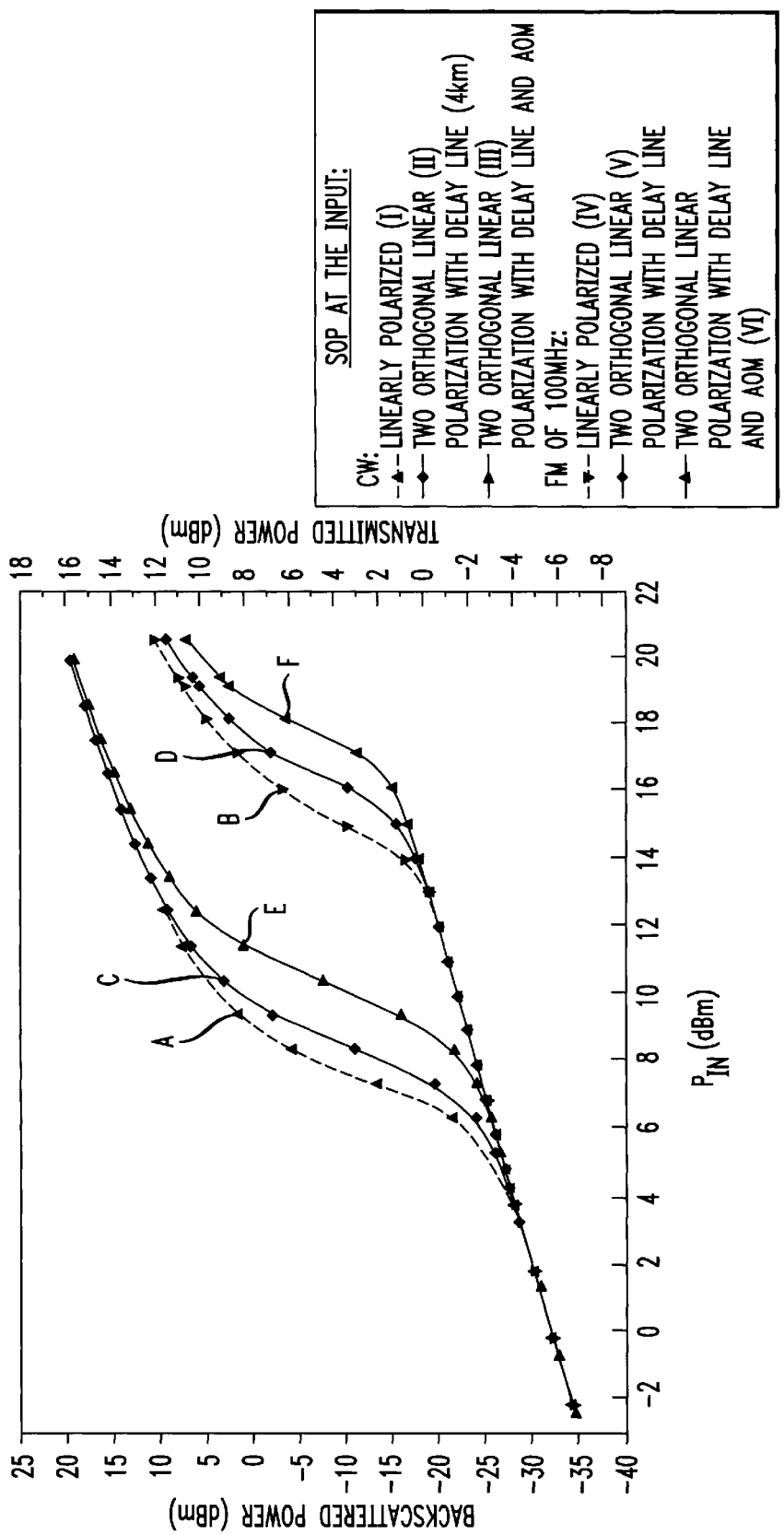
FIG. 4 is a graph depicting SBS thresholds as a function of input power for a variety of prior art applications and arrangements of the present invention.

The improvement in laser threshold by utilizing these techniques is evident from the graph of FIG. 4, which plots the backscattered (SBS threshold) power as a function of the input power. The "linearly" polarized plots A and B correspond to arrangements which do not utilize the polarization suppression arrangement of the present invention, plot A associated with a conventional prior art (CW) arrangement and plot B with an arrangement including FM dither. Also shown, for both the CW and FM cases (plots C and D, respectively) are the results from utilizing polarization multiplexing and incoherence (that is, with a time delay but no frequency shifting). An increase in SBS threshold of approximately 1 dB is shown for each of these plots. With the addition of a frequency shift (referring to plots E and F), an additional 3 dB of threshold power level is obtained.

Figure 6:
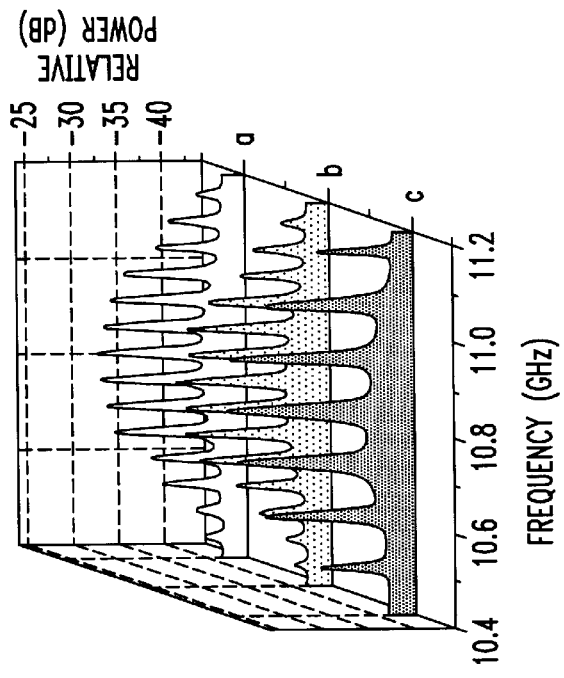
FIG. 6 is a graph of SBS spectra for arrangements including frequency dithering with the inventive polarization multiplexing technique.
Figure 5:
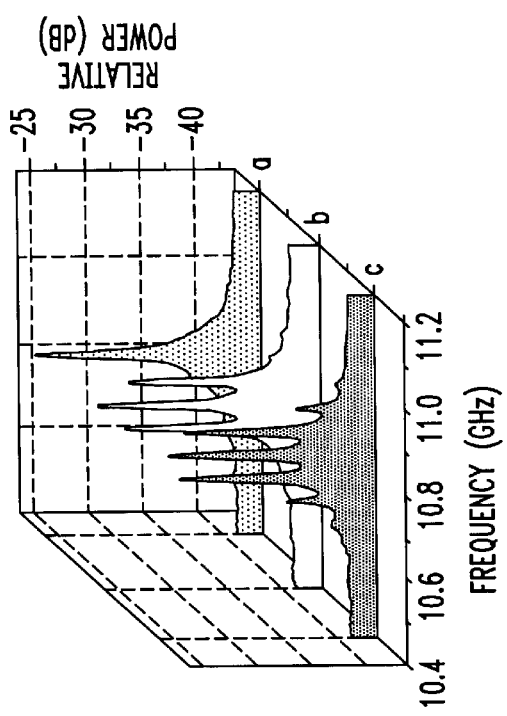
FIG. 5 is a graph of SBS spectra, as a function of frequency for a prior art CW signal and alternative arrangements using polarization multiplexing in accordance with the present invention.

FIGS. 5 and 6 illustrate the resultant SBS spectra associated with various embodiments of both the prior art and the present invention. In particular, FIG. 5 includes a set of SBS spectra under the following conditions: (a) a conventional laser source; (b) a "depolarized" optical source including the time delay of the present invention; and (c) a "depolarized" optical source including both a time delay and frequency shift of the present invention, where the plot in (c) is obtained for collinear signals (linearity achieved by replacing polarization beam combiner 26 with a conventional 3 dB coupler and adjusting the polarizations to be parallel). In both cases associated with the present invention (plots (b) and (c)), the SBS spectra now includes extra frequency components, thus raising the SBS threshold of the transmitter arrangement. Similarly, the plots of FIG. 6 illustrate the SBS spectra when FM dithering is impressed on the laser source. Obviously, the dithering results in adding even more frequency components to the SBS spectra, further raising the SBS threshold.

Figure 7:
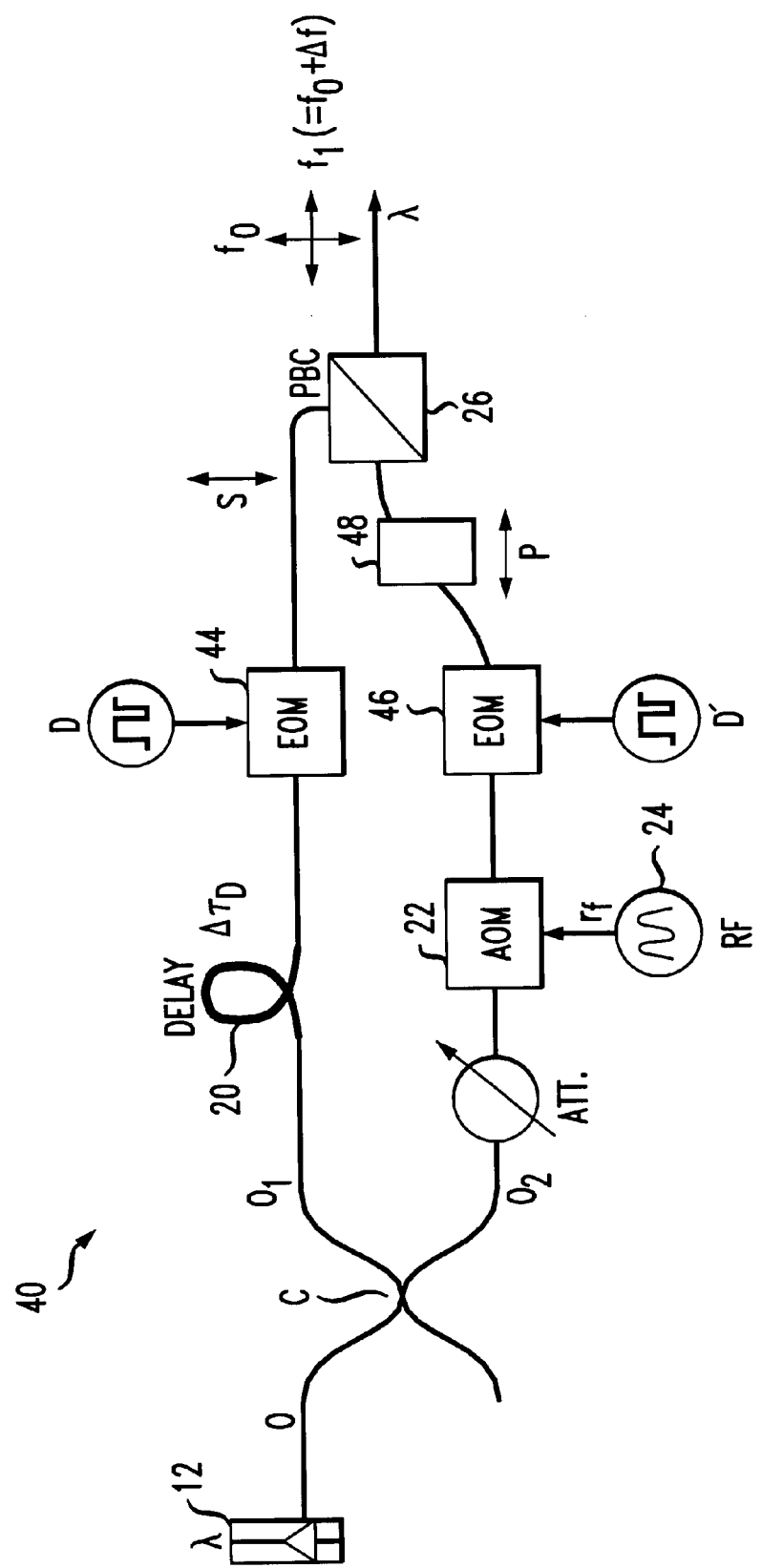
FIG. 7 illustrates an alternative embodiment of the present invention, utilizing a delay element and AOM, in cooperation with a pair of electro-optic modulators (a separate EOM disposed in each arm)

An alternative embodiment 40 of the present invention is illustrated in FIG. 7. In this case, a 3 dB coupler 42 is used to split output optical signal O from laser source 12 into two relatively equal power components, denoted $O_1$ and $O_2$ in FIG. 7. As with the previous embodiment discussed above in association with FIG. 1, one component (in this case, $O_1$, is subjected to a time delay $\Delta\tau_D$ and the remaining component ($O_2$) is frequency shifted by AOM 22 by a predetermined amount $\Delta f$. In this embodiment, a pair of electro-optic modulators 44, 46 are included, one on each arm of arrangement 40. EOMs 44, 46 are used to supply the input data stream to the transmitter, instead of directly providing the data D on the bias current supplied to laser source 12. In one embodiment data signal D and is complement D' are applied as inputs to EOMs 44 and 46, respectively. Alternatively, two different data streams, $D_1$ and $D_2$ may be simultaneously transmitted using this arrangement. Orthogonality between the signals in provided by including a polarization rotator device 48 in one signal path, as shown in FIG. 7. Thereafter, the two polarized components are re-joined in polarization beam combiner 26 to form the output of arrangement 40.

Figure 8A:
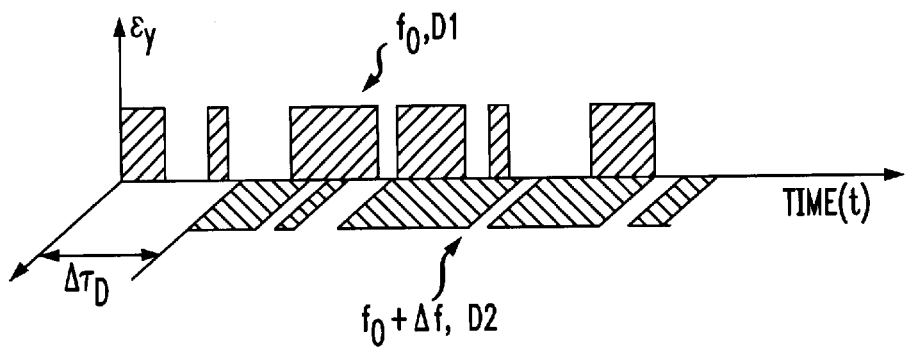
FIGS. 8A–8C shows the intensity variation with respect to time and frequency for the arrangement of FIG. 7.
Figure 8B:
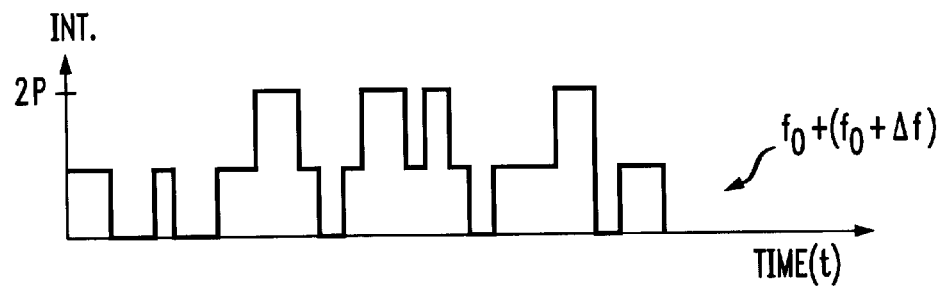
Figure 8C:
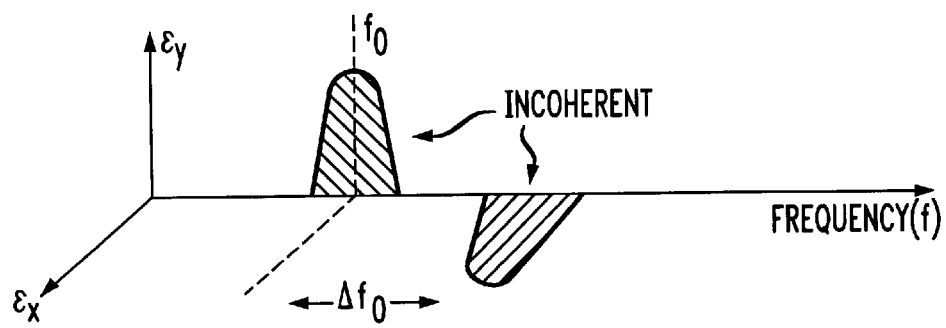

FIG. 8 contains various graphs illustrating the aspects of arrangement 40 as shown in FIG. 7. In particular, FIG. 8A illustrates the intensity variation, with respect to time, for the two signal components subsequent to the one component passing through the polarization rotator device 48. If EOMs 44, 46 are driven by the same (complementary) data, when one state-of-polarization (SOP) is "on", the other is "off", and vice versa. This arrangement thus provides the same amount of optical power to exist at any one time. The delay of the present invention, introducing the time delay $\Delta\tau_D$ as shown in FIG. 8A, breaks the coherence between the data streams. A possible intensity variation for this arrangement is shown in FIG. 8B, where the resultant power is shown as varying between 0 and 2P as a function of time. The frequency domain intensity is illustrated in FIG. 8C, with the two depolarized signals illustrated as also separated in frequency by the predetermined shift $\Delta f$ introduced by AOM 22.

Figure 9:
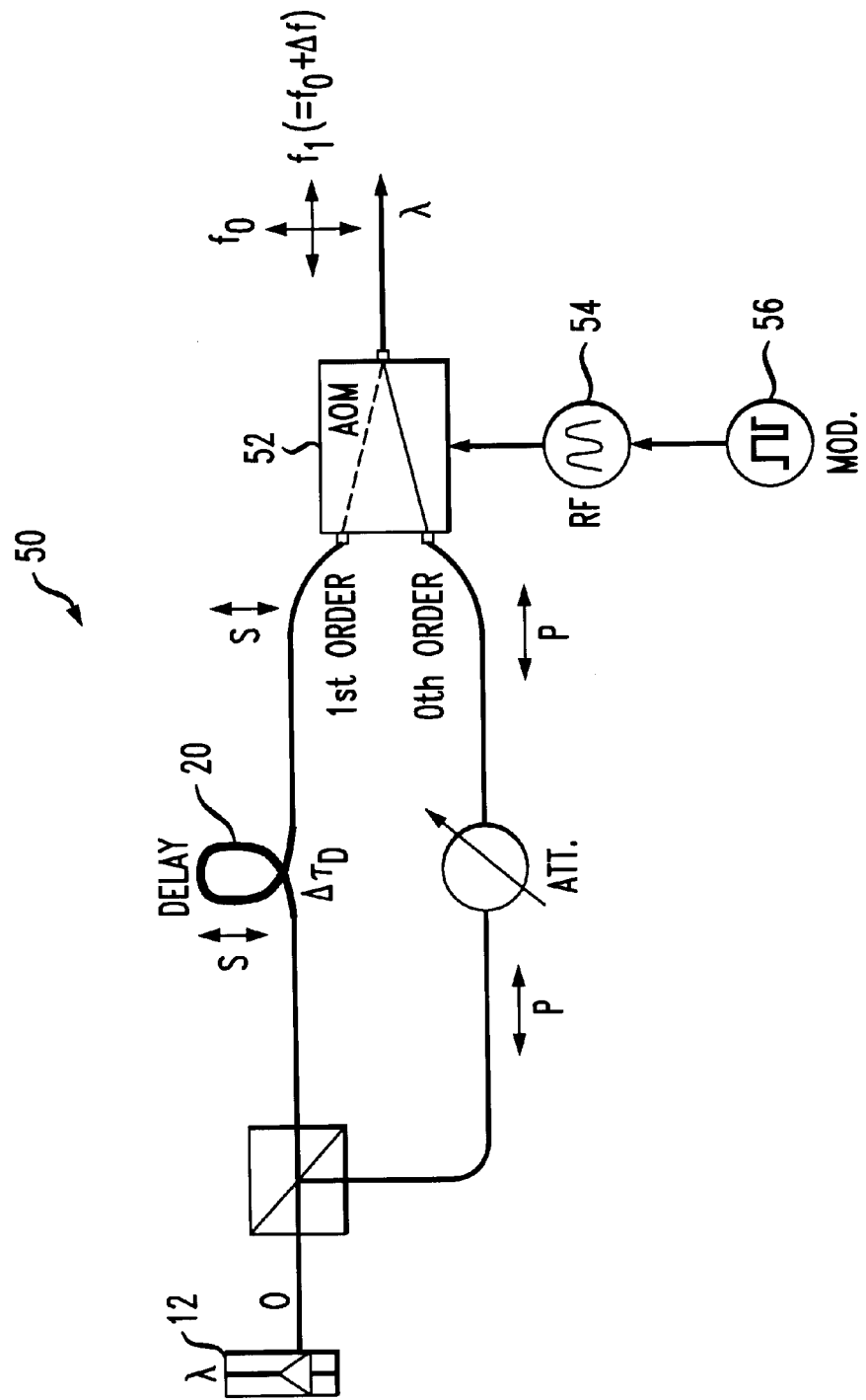
FIG. 9 illustrates yet another embodiment of the present invention, utilizing a switchable AOM responsive to both polarization states, to control the polarization state of the output signal.

Yet another embodiment 50 of the present invention is illustrated in FIG. 9. As before, the optical output O from laser source 12 passes through polarization beam splitter 14 to form the orthogonal components S and P, where component S is then subjected to a time delay $\Delta\tau_D$. These two components are then applied as separate inputs to an acousto-optic modulator 52, where modulator 52 is driven by an external RF source 54, as controlled by a data source 56. In particular, AOM 52 is controlled such that when the signal from data source 56 is a first state (e.g., a logic "1"), AOM 52 is positioned to provide as an output the time-delayed component S, and when the signal from data source 56 is a second state (e.g., a logic "0"), AOM 52 is positioned to provide as an output component P, where the action of AOM 52 will impress a phase shift between the components.

Figure 10:
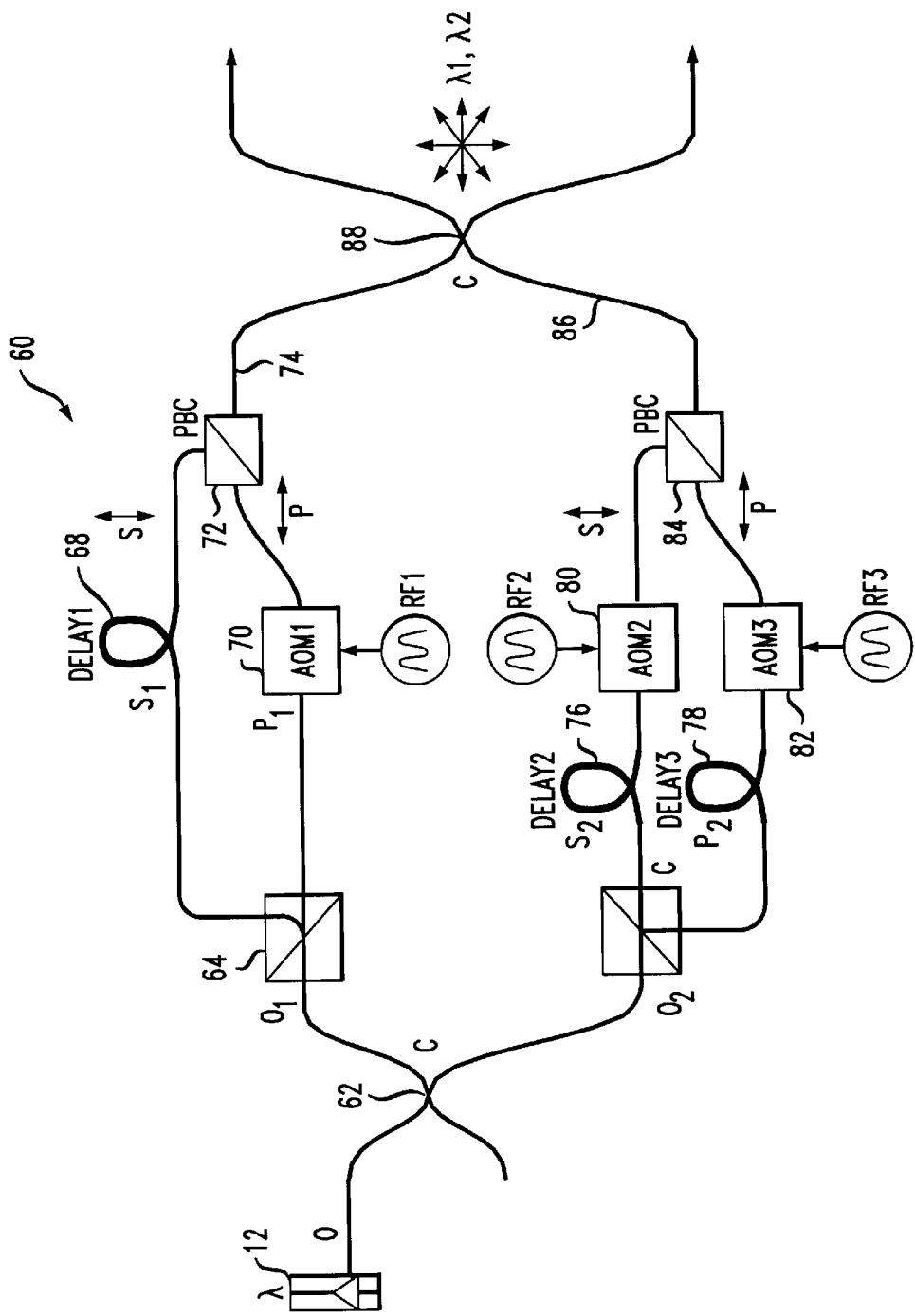
FIG. 10 illustrates an embodiment of the present invention wherein the input signal is first split into two components and each component separately polarization multiplexed.

Additional spectrum broadening in accordance with the present invention can be realized by using an arrangement such as that illustrated in FIG. 10. As shown, optical source 60 includes laser source 12, where the optical output O from source 12 is first split into two (relatively equal) components, denoted as $O_1$ and $O_2$, within a 3 dB coupler 62. Output signal $O_1$ is thereafter applied as an input to a first polarization beam splitter 64 to form orthogonal components $S_1$ and $P_1$. In similar fashion, signal $O_2$ is applied as an input to a second polarization beam splitter 66, forming orthogonal components $S_2$ and $P_2$. The components $S_1$ and $P_1$ are processed in the manner discussed above, using a first delay element 68 and AOM 70 to introduce both incoherence and a frequency shift between the components. The components are then re-combined in a polarization combiner 72 and provided as a first output along a signal path 74.

In this particular embodiment, components $S_2$ and $P_2$ are both time delayed, as shown in FIG. 10, where component $S_2$ passes through a second delay element 76 and component $P_2$ passes through a third delay element 78. The actual values of each time delay, $\Delta\tau_{D1}$, $\Delta\tau_{D2}$, and $\Delta\tau_{D3}$, are chosen so as to be slightly different, ensuring that each component is incoherent with respect to all other components. In order to also provide different, additional frequency shifts a pair of AOMs 80 and 82 are utilized with components $S_2$ and $P_2$ to provide the necessary, unique frequency shifts for each component. The time-delay, frequency-shifted components $S_2$ and $P_2$ are thereafter re-combined in a polarization combiner 84 and applied as inputs to a signal path 86. Referring to FIG. 10, the various components propagating along signal paths 74 and 86 are then applied as inputs to a coupler 88 to form the final output signal from arrangement 60.

Figure 11:
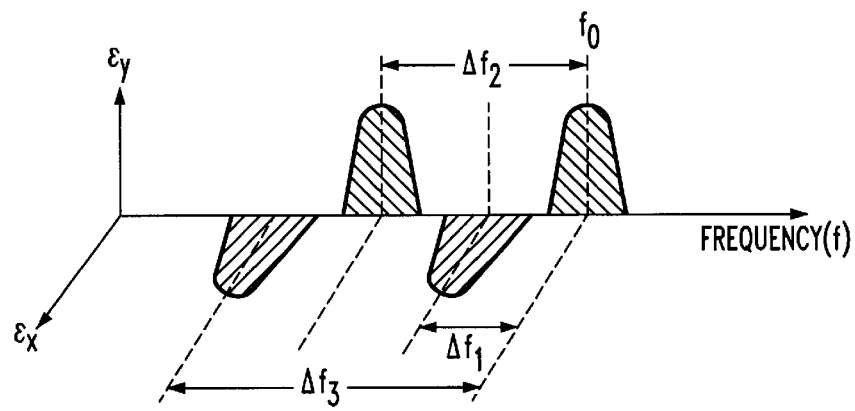
FIG. 11 is a graph of the signal intensity, as a function of frequency, for the arrangement of FIG. 10.

FIG. 11 illustrates the spectral power density distribution, with respect to polarization state, for arrangement 60 of FIG. 10. Illustrated in this diagram in particular, are the different, unique frequency shifts introduced by AOMs 70, 80 and 82.

Figure 12:
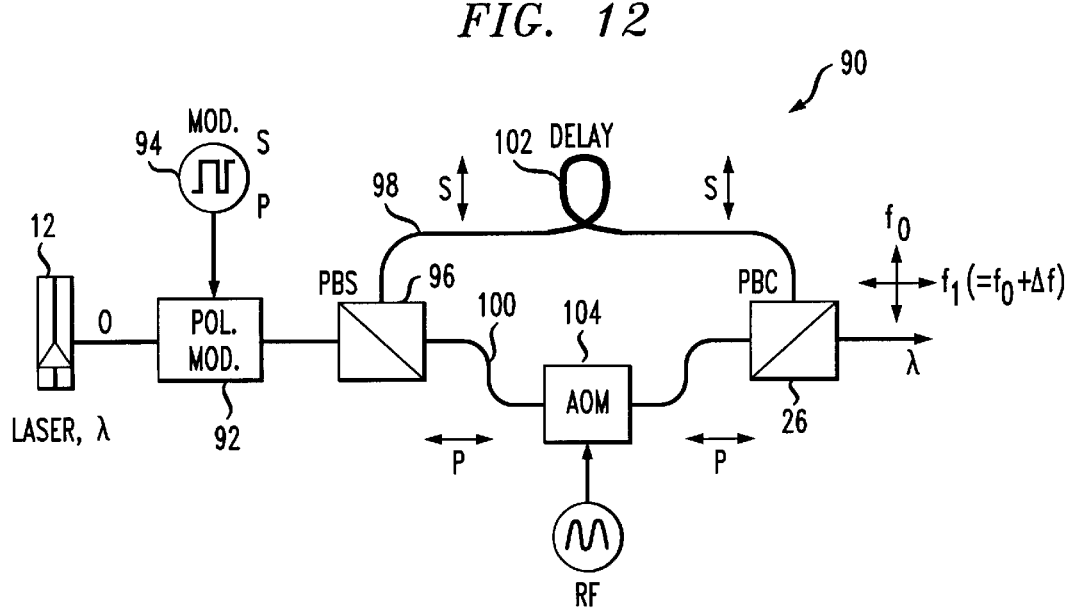
FIG. 12 is an alternative embodiment of the present invention utilizing a polarization modulator, coupled to the output of the laser source, to control the polarization state of the optical output signal from the transmitter.

FIG. 12 illustrates yet another embodiment 90 of the present invention, utilizing a separate polarization modulator 90 to provide both polarization diversity and frequency dithering to the optical signal. As before, a laser source 12 is used to provide an optical output signal O. An external modulator 94 is coupled to polarization modulator 92 and used to control the output polarization state from polarization modulator 92. In this arrangement, when modulator 94 transmits a first value (e.g., logic "1") to polarization modulator 92, the output will be an S-polarized signal, and when modulator 94 transmits a second value (e.g., logic "0") to polarization modulator 92, the output will be a P-polarized signal. The output from polarization modulator 94 is then provided as an input to a polarization beam splitter 96, which functions to direction the S component along a first signal path 98 and the P component along a second signal path 100. The coherence between the two components is broken by including a delay element 102 along signal path 98. As with the other embodiments discussed above, a frequency shift between the components is introduced by an acousto-optic modulator 104 inserted along the P-polarized signal path 100. The S and P components are thereafter combined in a polarization beam combiner 106 to form the final, polarization-multiplexed output signal.

It is to be understood that the various embodiments as discussed above are to be considered as exemplary only, there exist many other possible arrangements for supplying polarization multiplexing onto an optical transmission signal so as to suppress SBS in accordance with the present invention. Further, as mentioned above, any of the possible arrangements of the present invention may be embodied as discrete components (such, for example, optical fibers as the signal paths), integrated arrangements (using, for example, optical waveguides), or any hybrid sort of arrangement using a component of both discrete and integrated components. In general, the spirit of the present invention is to be limited only by the scope of the claims as appended hereto.

What is claimed is:

1. A method for suppressing stimulated Brillouin scattering in an optical transmission system, the method comprising the steps of:

a) providing a laser source for generating an optical signal O having a relatively narrow linewidth;

b) splitting the optical signal into a first signal component and a second signal component, the signal components being of orthogonal polarization states;

c) introducing a predetermined time delay $\Delta\tau_D$ into the first signal component;

d) introducing a predetermined frequency shift $\Delta f$ into the second signal component;

e) combining the time-delay first signal component and the frequency-shifted second signal component to form a polarization multiplexed optical signal with increases linewidth; and f) coupling said polarization multiplexed optical signal into the optical transmission system output fiber.

2. The method as defined in claim 1 wherein in performing step b), the first orthogonal polarization state is defined as the S polarization state and the second orthogonal polarization state is defined as the P polarization state.

3. The method as defined in claim 1 wherein in performing step b), the first orthogonal polarization state is defined as the P polarization state and the second orthogonal polarization state is defined as the S polarization state.

4. The method as defined in claim 1 wherein in performing step a), the method further comprises the step of:

1) directly modulating the laser source with an FM dither signal to further increase the optical output signal linewidth.

5. The method as defined in claim 1 wherein in performing step a), the method further comprises the step of:

1) phase modulating the output optical signal from the laser source to further increase the optical output signal linewidth.

6. The method as defined in claim 1 wherein in performing step b), the method further comprises the steps of:

1) directly modulating the laser source with an FM dither signal to further increase the optical output signal linewidth; and 2) phase modulating the output optical signal from the laser source to further increase the optical output signal linewidth.

7. The method as defined in claim 1 wherein in performing step c), an additional length of optical fiber is used to introduce the predetermined time delay $\Delta\tau_D$.

8. The method as defined in claim 1 wherein in performing step d), an acousto-optic modulator is used to introduce the predetermined frequency shift $\Delta f$.

9. Apparatus for communicating optical signals over an optical fiber comprising a laser source for providing an optical output signal;

a polarization beam splitter coupled to the laser for dividing the optical output signal into a first signal component and a second signal component, the signal components being orthogonally polarized, and coupling the first and second signal components into separate first and second signal paths;

a delay element coupled to said first signal path for introducing a predetermined time delay $\Delta\tau_D$ into the first orthogonally polarized signal component;

a frequency shifting element coupled to said second signal path for introducing a predetermined frequency shift $\Delta f$ into a the second orthogonally polarized signal component; and a polarization beam combiner responsive to the time-delayed first orthogonally polarized signal component and the frequency-shifted second orthogonally polarized signal component.

10. An arrangement as defined in claim 9 wherein the delay element comprises a section of optical fiber.

11. An arrangement as defined in claim 9 wherein the frequency shifting element comprises an acousto-optic modulator.

12. An arrangement as defined in claim 9 wherein the frequency shifting element comprises an electro-optic modulator.

13. An arrangement as defined in claim 9 wherein the arrangement further comprises an FM modulator coupled to the laser source for applying a frequency dither signal to the optical output signal.

14. An arrangement as defined in claim 9 wherein the arrangement further comprises an electro-optic modulator coupled to the output from the laser source for introducing a phase modulation onto the optical output signal.

15. An arrangement as defined in claim 9 wherein the arrangement further comprises an FM modulator coupled to the laser source for applying a frequency dither signal to the optical output signal; and an electro-optic modulator coupled to the output from the laser source for introducing a phase modulation onto the optical output signal.

* * * * *